US009167125B2

(12) United States Patent
Shimazu et al.

(10) Patent No.: US 9,167,125 B2
(45) Date of Patent: Oct. 20, 2015

(54) IMAGE READING DEVICE AND RECORDING DEVICE

(71) Applicant: SEIKO EPSON CORPORATION, Tokyo (JP)

(72) Inventors: Masamitsu Shimazu, Matsumoto (JP); Shintaro Miyamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/923,763

(22) Filed: Jun. 21, 2013

(65) Prior Publication Data

US 2013/0342881 A1    Dec. 26, 2013

(30) Foreign Application Priority Data

Jun. 25, 2012    (JP) ................................. 2012-142247

(51) Int. Cl.
| | |
|---|---|
| *H04N 1/04* | (2006.01) |
| *H04N 1/10* | (2006.01) |
| *H04N 1/00* | (2006.01) |
| *H04N 1/12* | (2006.01) |
| *H04N 1/193* | (2006.01) |

(52) U.S. Cl.
CPC .......... *H04N 1/0461* (2013.01); *H04N 1/0058* (2013.01); *H04N 1/00578* (2013.01); *H04N 1/0464* (2013.01); *H04N 1/1039* (2013.01); *H04N 1/1061* (2013.01); *H04N 1/1017* (2013.01); *H04N 1/12* (2013.01); *H04N 1/193* (2013.01)

(58) Field of Classification Search
CPC . H04N 1/0461; H04N 1/1061; H04N 1/1039; H04N 1/00578; H04N 1/0058; H04N 1/0464; H04N 1/1017; H04N 1/12; H04N 1/193

USPC ................................. 358/497, 498, 474, 496
See application file for complete search history.

(56) References Cited

U.S. PATENT DOCUMENTS

| | | | |
|---|---|---|---|
| 2005/0023743 A1* | 2/2005 | Fujii et al. ..................... 271/3.14 |
| 2006/0023267 A1 | 2/2006 | Ikeno et al. | |
| 2009/0073507 A1* | 3/2009 | Fukuda ........................ 358/474 |
| 2009/0316222 A1 | 12/2009 | Oshida et al. | |
| 2010/0060954 A1 | 3/2010 | Ikeno et al. | |
| 2010/0073739 A1* | 3/2010 | Sekiguchi et al. ............ 358/474 |

(Continued)

FOREIGN PATENT DOCUMENTS

| | | |
|---|---|---|
| CN | 101248658 | 6/2006 |
| CN | 100396082 | 8/2008 |
| JP | 2001-245108 | 9/2001 |
| JP | 2004-328154 | 11/2004 |
| JP | 2008-129247 | 6/2008 |

(Continued)

*Primary Examiner* — Houshang Safaipour
(74) *Attorney, Agent, or Firm* — Workman Nydegger

(57) ABSTRACT

An image reading device includes a transparent plate and a CIS. The transparent plate has a placement area in which an original document is placed and a transport area which corresponds to a transport position of the original document by a transport device. The CIS reads an image of the original document via the transparent plate. The transport device includes an inverting path at a position on the transparent plate opposite to the placement area seen from the transport area. On a second surface side of the transparent plate, the CIS is moved among a first reading area which corresponds to the placement area of the transparent plate, a second reading area which corresponds to the transport area of the transparent plate, and a standby position defined below the inverting path of the transport device.

12 Claims, 5 Drawing Sheets

(56) References Cited

U.S. PATENT DOCUMENTS

2012/0281260 A1 11/2012 Ikeno et al.
2014/0118798 A1* 5/2014 Ikeno et al. .................. 358/465

FOREIGN PATENT DOCUMENTS

| | | |
|---|---|---|
| JP | 2010-041481 | 2/2010 |
| JP | 2011-066533 | 3/2011 |

* cited by examiner

IMAGE READING DEVICE AND RECORDING DEVICE

BACKGROUND

1. Technical Field

The present invention relates to an image reading device which includes a movable reading unit configured to read an image of an original document. The present invention also relates to a recording device used in combination with the image reading device.

2. Related Art

As an exemplary recording device which may be used in combination with such an image reading device, a multi-functional device described in JP-A-2010-41481 has been proposed. An image reading device of this multi-functional device includes a transparent plate on which, on the side of a first surface thereof, an original document may be placed and includes a reading unit configured to read an image of the original document while moving, on the side of a second surface of the transparent plate, in parallel with the transparent plate. On the image reading device, an original document transport device is disposed to cover the entire first surface of the transparent plate.

The original document transport device may pivot between a closed position and an open position: in the closed position, the original document transport device is disposed over the image reading device to cover the transparent plate; in the open position, the transparent plate is uncovered. In the closed position, the original document transport device transports an original document from a paper feeding unit to a paper output unit via a partial area of the transparent plate. The partial area of the transparent plate corresponds to an exposure area through which an image on the original document transported by the original document transport device is exposed to the reading unit during transportation. When the original document transport device is in the open position, the original document is placed on the transparent plate or removed from the transparent plate by a user.

The reading unit reads, while moving, an image of the original document placed on the transparent plate via the transparent plate. The reading unit reads an image of the original document while moving in a first reading area corresponding to a placement area of the original document on the transparent plate. When the original document transport device is in the closed position, the reading unit reads the transported original document in the following manner. The reading unit, stopped in a second reading area corresponding to the exposure area which is the partial area of the transparent plate, reads an image of the original document passing above the exposure area while being transported by the original document transport device. That is, the reading unit reads an image of the original document placed on the side of the first surface of the transparent plate by moving to either of the first reading area or to the second reading area on the side of the second surface of the transparent plate. The reading unit performs a predetermined standby operation at a predetermined standby position when not performing a reading operation of an image of the original document. The standby position in this case is situated in an area between the first reading area and the second reading area (a standby position defining area).

A transport path along which the original document is transported from the paper feeding unit to the paper output unit via an area above the exposure area which is the partial area of the transparent plate in the original document transport device inverts the front and back sides of the original document in a process in which the original document is transported from the paper feeding unit to the paper output unit. For this reason, the transport path includes, in an intermediate portion thereof, an inverting path which is U-shaped in cross section when seen in a side view.

On the side of the first surface of the transparent plate, the position of the inverting path is not situated, on the transparent plate, above any of the exposure area, the placement area of the original document and the standby position defining area of the reading unit. That is, the reading unit is not moved toward an area below the inverting path in the image reading device. Therefore, in the image reading device, the area below the inverting path has been a wasted space.

Such a situation is not particular to the multi-functional device described above but is commonly seen in image reading devices including a movable reading unit which reads an image of an original document and recording devices used in combination with these image reading devices.

SUMMARY

An advantage of the invention is to provide an image reading device which can reduce a wasted space and to thereby contribute to reduce the size of the entire machine and to provide a recording device used in combination with the image reading device.

According to an aspect of the invention, an image reading device includes: a transparent plate which includes, on a first surface thereof, a placement area in which an original document may be placed; a reading unit configured to read an image of the original document via the transparent plate from a second surface side of the transparent plate; and an original document transport device which is moved between a closed position at which the original document transport device is disposed over the transparent plate to cover the first surface side of the transparent plate and an open position at which the first surface side of the transparent plate is uncovered. In the closed position, the original document transport device transporting the original document via a partial area which is separated from the placement area on the transparent plate. The original document transport device includes an inverting path along which the original document is transported in a manner in which front and back sides thereof are inverted at a position opposite to the placement area seen from the partial area of the transparent plate. On the second surface side of the transparent plate, the reading unit is moved among a first reading area which corresponds to the placement area of the transparent plate, a second reading area which corresponds to the partial area of the transparent plate, and a standby position defined below the inverting path of the original document transport device.

According to this aspect of the invention, on the side of the second surface of the transparent plate, the area below the inverting path which has been a wasted space in the original document transport device can be used as the standby position in which the reading unit performs a standby operation. Therefore, it is possible to reduce a wasted space and contribute to reduce the size of the entire machine.

According to another aspect of the invention, an image reading device includes: a transparent plate which includes, on a first surface thereof, a placement area in which an original document may be placed; a reading unit configured to read an image of the original document via the transparent plate from a second surface side of the transparent plate; and an original document transport device which is moved between a closed position at which the original document transport device is disposed over the transparent plate to cover the first surface side of the transparent plate and an open position at which the first surface side of the transparent plate is uncovered. In the closed position, the original document transport device transporting the original document via a partial area which is separated from the placement area on the transparent plate. The original document transport device includes an inverting path along which the original document is transported in a manner in which front and back sides thereof are inverted at a position opposite to the placement area seen from the partial area of the transparent plate. White reference is provided on the second surface side as detection reference of the original document. The white reference is defined below the inverting path in the original document transport device.

According to this aspect of the invention, since the white reference is defined in the area below the inverting path which has been a wasted space in the original document transport device, it is possible to reduce a wasted space and contribute to reduce the size of the entire machine.

The white reference of the image reading device according to a further aspect of the invention is defined above a standby position which is defined below the inverting path in the original document transport device.

According to this aspect of the invention, the white reference is defined in the area above the standby position defined below the inverting path in the original document transport device which has been a wasted space. Therefore, it is possible to reduce a wasted space and contribute to reduce the size of the entire machine.

In the image reading device according to a still further aspect of the invention, the first reading area and the second reading area continue from each other. According to this aspect of the invention, by reducing the wasted space produced between the first reading area and the second reading area, it is possible to further contribute to reduce the size of the entire machine.

In the image reading device according to a still further aspect of the invention, the first reading area and the second reading area are formed on the second surface of the single transparent plate. According to this aspect of the invention, a mechanism for attaching the transparent plate in which the reading unit reads an original document in the first reading area and attaching the transparent plate in which the reading unit reads the original document in the second reading area to the document reading device can be simplified.

In the image reading device according to a still further aspect of the invention, the width of the partial area in the direction perpendicular to the direction in which the original document is transported by the original document transport device is greater than the width of the placement area in the direction perpendicular to the direction in which the original document is transported.

According to this aspect of the invention, it is possible that, in the partial area, the original document can be read in a range wider than the placement area of the original document. Therefore, even if, for example, the original document is transported obliquely by the original document transport device, the original document can be read reliably to the ends in the width direction thereof.

The image reading device according to a still further aspect of the invention further includes a fixing member which is fixed to edge portions of the transparent plate of the image reading device and includes a corner at which two adjacent sides form a right angle at at least an end of the opposite side of the partial area. The original document is disposed so as to be in contact with the two sides which are adjacent to each other via the corner of the fixing member.

According to this aspect of the invention, the member which aligns the end of the placement area of the original document on the transparent plate with a reading start position and the member which fixes the transparent plate to the image reading device can be shared. Therefore, it is possible to reduce the number of parts and to further contribute to reduce the size of the entire machine. A recording device according to an aspect of the invention further includes a recording unit configured to record on a medium, and an image reading device having a configuration described above. According to this aspect of the invention, in the recording device, the same effect as that of the image reading device having the configuration described above can be provided.

DESCRIPTION OF EXEMPLARY EMBODIMENTS

Figure 1:
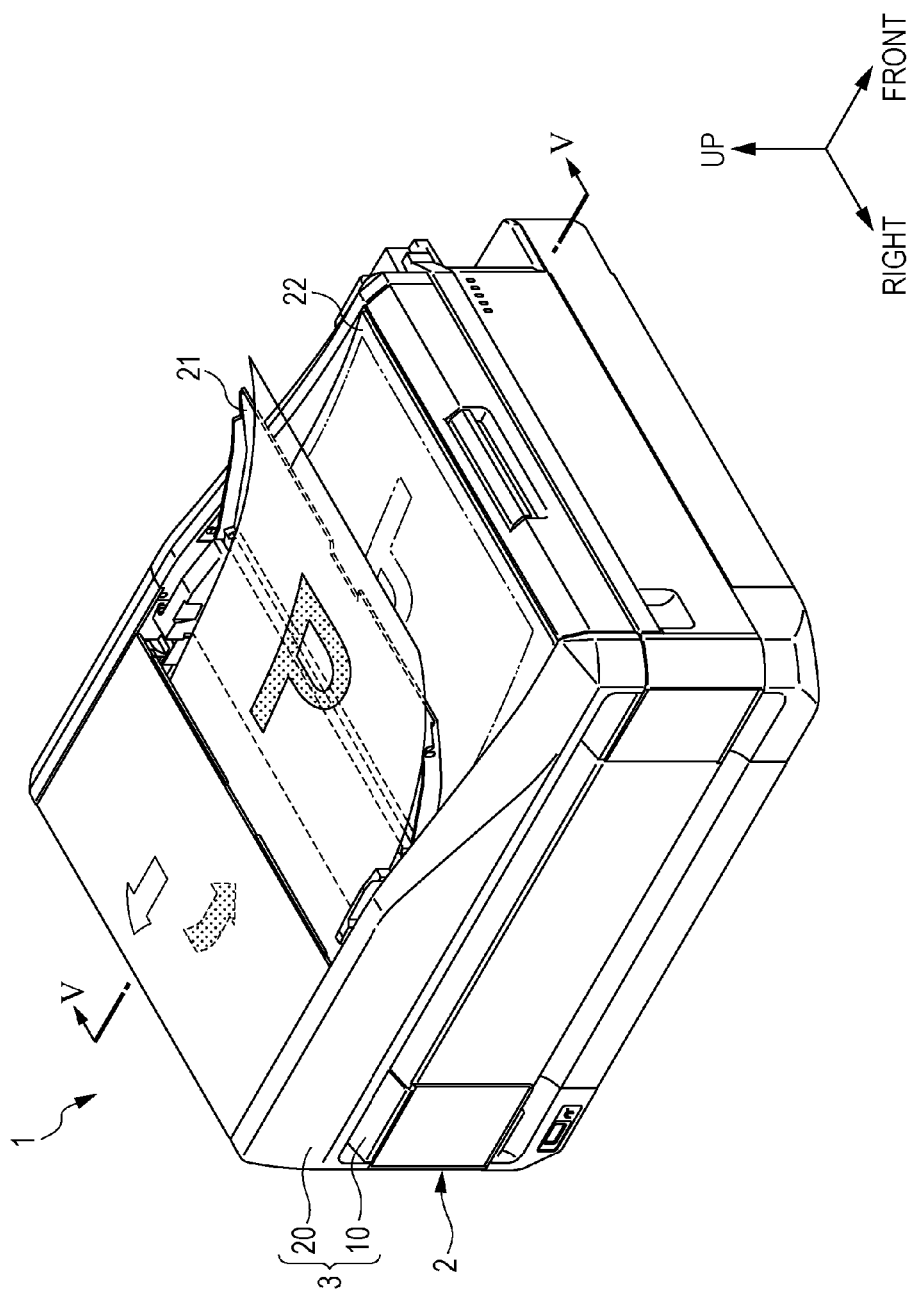
FIG. 1 is a perspective view of a multi-functional device according to an embodiment of the invention.

Hereinafter, with reference to the drawings, the entire configuration of a multi-functional device 1 of the present embodiment will be described. In the following description, the "front-rear direction," the "left-right direction" and the "up-down direction" are indicated by arrows pointing in their respective directions in the drawings.

As illustrated in FIG. 1, a multifunction machine 1 includes an image formation device (i.e., a recording device) 2 and an image reading device 3. The image formation device 2 includes a recording unit, such as a recording head, which performs printing of characters and printing of images, by injecting ink, on a sheet of printing paper as an example of a medium. The image reading device 3 is disposed above the image formation device 2 and is configured to read an image of an original document P. The image reading device 3 includes, as main components thereof, a document reading device 10 and an original document transport device (hereafter, referred to as "transport device") 20. The document reading device 10 contains various devices for reading an image. The original document transport device 20 is disposed above the document reading device 10 and is configured to transport the original document P to a predetermined position in the document reading device 10. The image formation device 2 may perform a printing process (i.e., a record process) of the image read by the image reading device 3.

The transport device 20 includes a feed tray 21 and an output tray 22. The original document P before the image thereof is read by the document reading device 10 is placed on the feed tray 21. The original document P after the image thereof is read by the document reading device 10 is output onto the output tray 22.

Figure 2:
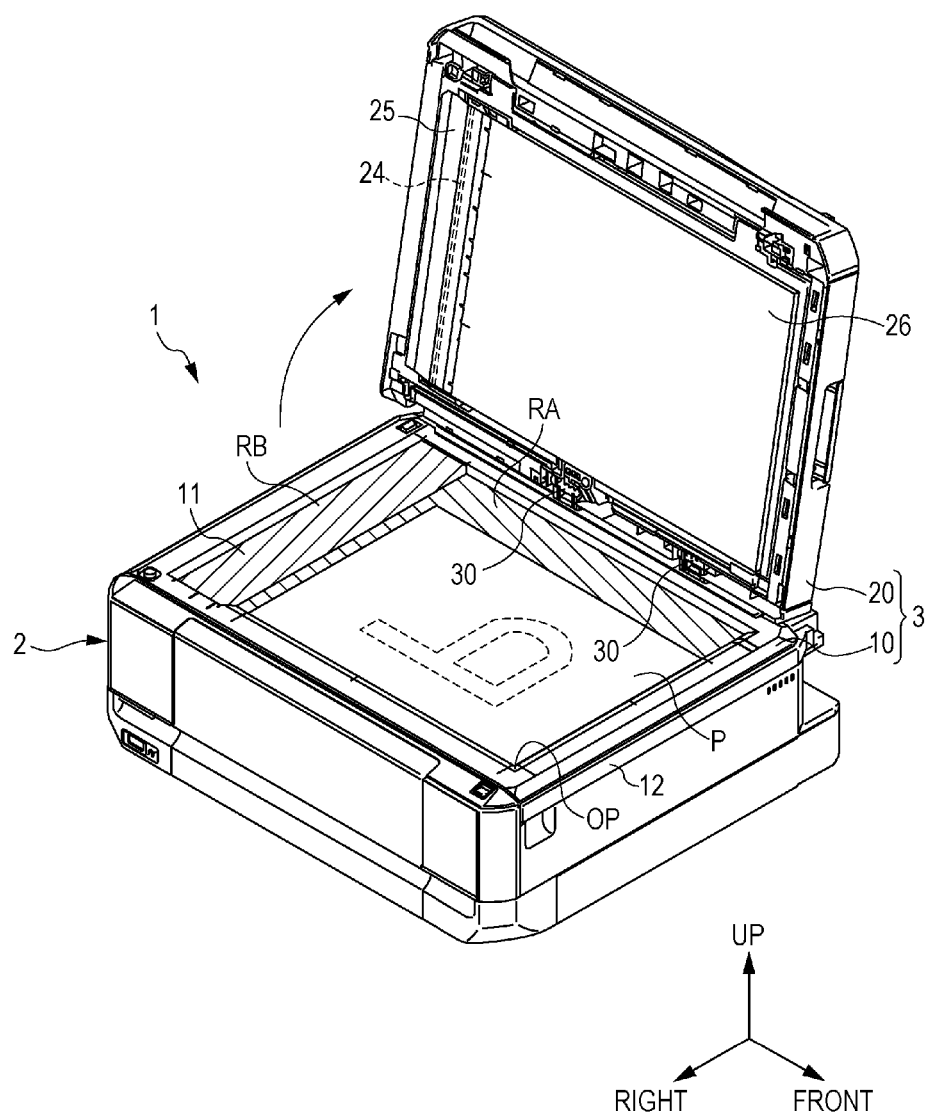
FIG. 2 is a perspective view of the multi-functional device of the embodiment in which an original document transport device is in an open position.

As illustrated in FIG. 2, the document reading device 10 and the transport device 20 are joined to each other at left edges thereof in a pivotable manner via hinges 30. Therefore, when a user lifts the transport device 20 at a right edge thereof, the transport device 20 is moved to an open position illustrated in FIG. 2 from a closed position illustrated in FIG. 1.

The document reading device 10 includes a transparent plate 11 on which the original document P is placed and a frame member 12 to which the transparent plate 11 is fixed. The transparent plate 11 is rectangular in shape and is attached from below to the rectangular frame member 12. The transparent plate 11 is divided into a placement area RA and a transport area (i.e., a partial area) RB. The original document P is placed in the placement area RA. The transport area RB corresponds to a transport position of the original document P by the transport device 20. The frame member 12 is disposed above the document reading device 10.

The transport device 20 includes: a transport path 23 on which the original document P is transported from the feed tray 21 to the output tray 22 (see FIG. 5); an opening 24 through which the original document P transported on the transport path 23 is exposed to the document reading device 10; a transparent cover member 25 which covers the opening 24; and a mat 26 which presses the original document P placed on the transparent plate 11.

The opening 24 is formed in a rectangular shape which has a predetermined length, on the transparent plate 11, toward the front direction from an inner edge of the rear side of the frame member 12 and which has a width substantially the same as the distance between the left and right inner edges of the frame member 12, when the transport device 20 is moved to the closed position. The transport area RB is defined, on the transparent plate 11, as an area corresponding to the opening 24 on the transparent plate 11 when the transport device 20 is moved to the closed position.

The mat 26 is formed in a rectangular shape which has a length, on the transparent plate 11, from an inner edge of a front side of the frame member 12 toward the rear direction to reach an area corresponding to the opening 24 with a predetermined distance and has a width the same as the distance between the left and right inner edges of the frame member 12, when the transport device 20 is moved to the closed position. The placement area RA is defined on the transparent plate 11 as an area in which original documents P of a plurality of predetermined sizes can be placed at positions defined by each of the front and right inner edges which are adjacent two sides of the frame member 12. The placement area RA is defined as an area which continues from the transport area RB. That is, on the transparent plate 11, the placement area RA and the transport area RB continue from each other with no partition as a part of the frame member 12 being disposed therebetween.

Figure 3:
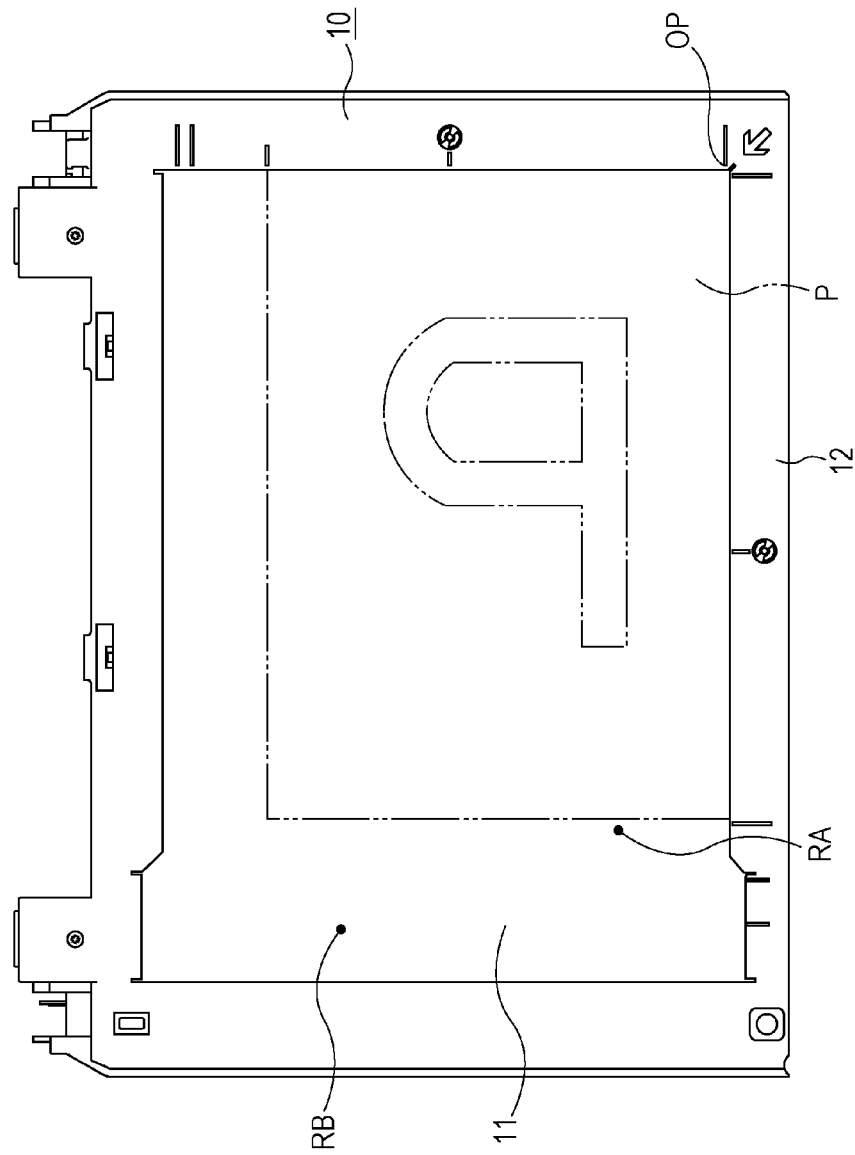
FIG. 3 is a plan view of a document reading device of the multi-functional device of the embodiment.

As illustrated in FIG. 3, the width of the transport area RB in the left-right direction (i.e., the main scanning direction of a CIS 13) is greater than the width of the placement area RA in the left-right direction. That is, in the transport area RB, it is considered to be able to read the original document P in a wider range than in the placement area RA. Therefore, even if, for example, the original document P is transported obliquely by the transport device 20, the read image of the original document P is reliably read to the ends in the width direction thereof. Tilting of the read image due to tilting of the original document P may be corrected by well-known image processing techniques. If, as in this case, the width of the transport area RB in the left-right direction is made greater than the width of the placement area RA in the left-right direction, it is necessary to set the width of the CIS 13, the width of the opening 24 of the transport path 23, and the width of the transparent cover member 25 in the left-right direction to be greater accordingly.

Figure 4:
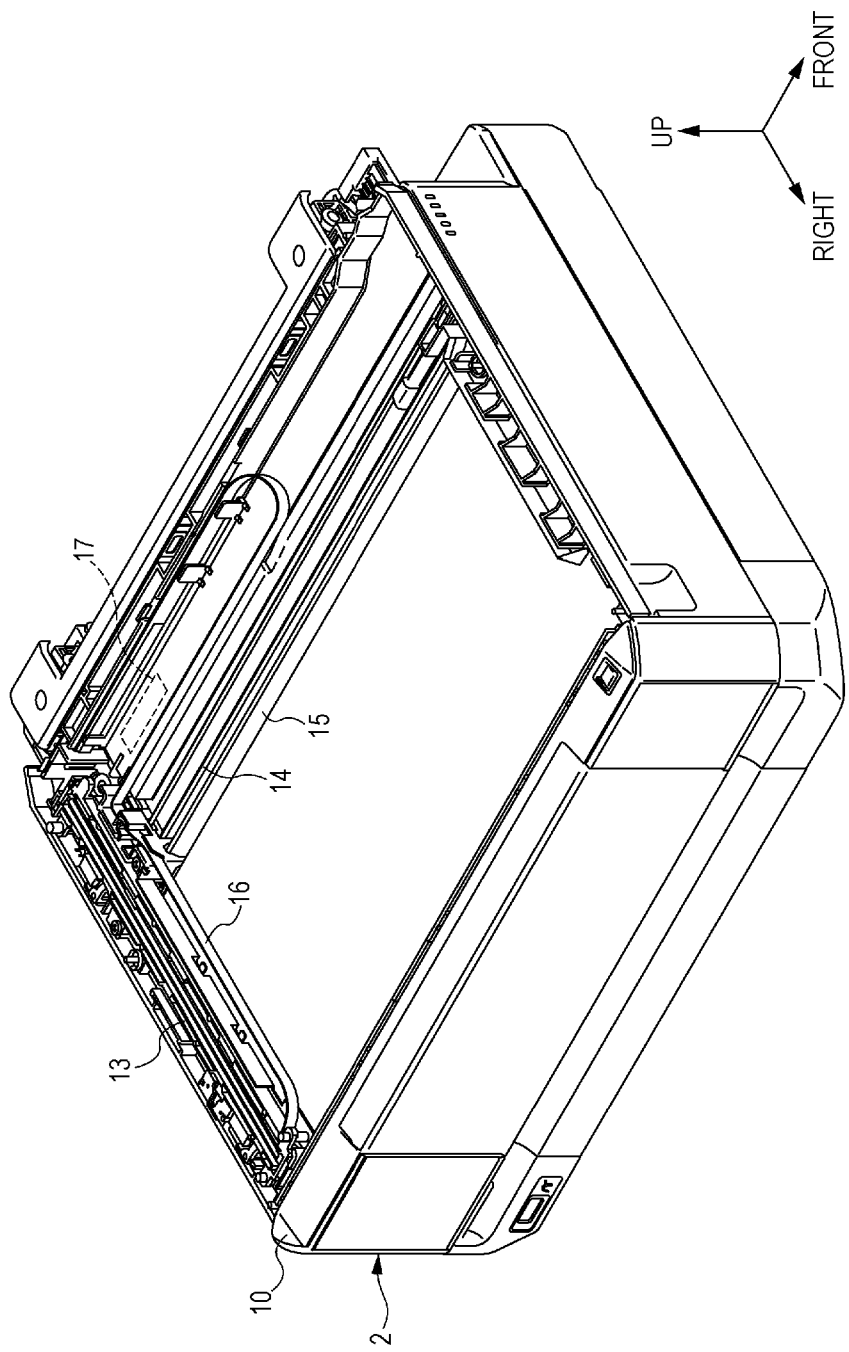
FIG. 4 is a perspective view illustrating inside of the document reading device of the multi-functional device of the embodiment.

Next, with reference to FIG. 4, an internal configuration of the document reading device 10 will be described. In FIG. 4, the transparent plate 11 and the transport device 20 are not illustrated. As illustrated in FIG. 4, the document reading device 10 includes, inside thereof, a contact image sensor module 13 (hereafter, referred to as "CIS 13") for reading an image of the original document P via the transparent plate 11; a driving belt 14 which is driven to move the CIS 13; and a rail 15 along which the movement of the CIS 13 in the front-rear direction is guided. In a space area in which the CIS 13 is moved in the document reading device 10, a flexible flat cable 16 (hereafter, referred to as "FFC 16") which connects the CIS 13 to a control device (i.e., a processing unit) 17 disposed in the document reading device 10 is disposed.

The length of the CIS 13 is substantially the same as the width of the transparent plate 11 in the left-right direction. The rail 15 is disposed at the bottom of the document reading device 10 and extends in the front-rear direction. The driving belt 14 is wound, along the front-rear direction of the document reading device 10, around pulleys (not illustrated) disposed at the front and rear portions of the document reading device 10. The rear-side pulley of the document reading device 10 is connected to a motor (not illustrated). The driving belt 14 is fixed to the CIS 13 at a portion between the two pulleys. The driving belt 14 is driven by the motor to move the CIS 13 in the front-rear direction.

The FFC 16 is formed as a flat belt constituted by a plurality of lead wires arranged in parallel and covered. The FFC 16 includes, as the plurality of lead wires, signal lines which transmit data representing the image of the original document P read by the CIS 13 and grounding conductors which connect the CIS 13 to ground. The FFC 16 transmits the data representing the image of the original document P from the CIS 13 to a control device 17 which processes the data. The FFC 16 includes a U-shaped curved portion at the other end side of the FFC 16 from the middle in the length direction and therefore may be contained in a bendable manner in the document reading device 10.

At least the bendable moving portion of the FFC 16 is disposed such that the width direction (i.e., the short direction) of the FFC 16 is substantially perpendicular to the transparent plate 11 as illustrated in FIG. 4. If the FFC 16 is disposed horizontally to the transparent plate 11, there is a possibility that the FFC 16 abuts the transparent plate 11 especially in the portion curved in the U-shape, whereby the transparent plate becomes dirty or the FFC 16 becomes worn. However, if the FFC 16 is disposed vertically to the transparent plate 11, there is no such possibility.

In the multifunction machine 1 of the present embodiment, since the width of the transport area RB in the left-right direction is greater than the width of the placement area RA in the left-right direction, it is not possible to align the original document at a corner on the side of the transport area RB as it has been possible in the related art multifunction machines. Therefore, the original document is aligned by placing the original document P on the side opposite to the side of the transport area RB, i.e., specifically, at a position to be in contact with an inner edge with an intersection on the front and right side of the frame member 12 in the placement area RA of the transparent plate 11 being as an original position OP. Then, the CIS 13 reads the original document P while moving from a reading start position C to a reading end position D. In this case, although it is possible to newly manufacture a CIS 13 dedicated to the multifunction machine 1 of the present embodiment in order to read the original document from the side opposite to the side of the related art, there is a problem that such a newly manufactured CIS 13 increases in cost accordingly.

Then, regarding the CIS 13 of the present embodiment, it is possible to read from the opposite side using the related art CIS 13. In the related art configuration, the CIS 13 illustrated in FIG. 4 is disposed in the opposite direction along the left-right direction and one end of the FFC 16 is connected, at the left end of the CIS 13, to a sensor substrate which is contained inside the CIS 13. The other end of the FFC 16 is drawn inside the document reading device 10 from an opening (not illustrated) formed at the left end on the rear side of the document reading device 10 and is connected to the control device 17 situated inside the document reading device 10.

However, as illustrated in FIG. 4, the CIS 13 of the present embodiment is disposed in the opposite direction along the left-right direction to those of the related art configuration. This is because the reading direction of the CIS 13 is previously determined. Therefore, one end of the FFC 16 is connected to the sensor substrate which is contained inside the CIS 13 in a state in which one end side of the FFC 16 from the middle in the length direction is attached so as to extend, with respect to the front side of the CIS 13, from the left end portion to the right end portion of the CIS 13. The other end side of the FFC 16 is drawn inside the document reading device 10 from the opening formed at the left end on the rear side of the document reading device 10 and is connected to the control device 17 situated inside the document reading device 10.

If the control device 17 may be disposed on the right side of the multifunction machine 1, it is not necessary that the FFC 16 is attached so as to extend, with respect to the front side of the CIS 13, from the left end portion to the right end portion of the CIS 13 as in this case and it is only necessary that the FFC 16 is connected, at the right end portion of the CIS 13, to the sensor substrate contained inside the CIS 13. However, a manipulation panel, a display panel, a paper cassette, an output unit of a printed print media, and so forth are disposed on the right side of the multifunction machine 1 and therefore the control device 17 is not able to be disposed on the right side of the multifunction machine 1. Therefore, the control device 17 is disposed on the left side of the multifunction machine 1, whereby the FFC 16 is attached so as to extend, with respect to the front side of the CIS 13, from the left end portion to the right end portion of the CIS 13.

An internal configuration of the transport device 20 will be described with reference to FIG. 5. The output tray 22 is disposed below the feed tray 21. Therefore, the transport path 23 includes an inverting path 23A which is U-shaped in cross section. The opening 24 is situated at an end portion of the inverting path 23A.

Next, operations and effects of the thus-configured image reading device 3 and image formation device 2 will be described with reference to FIG. 5. As illustrated in FIG. 5, in the inner side of the document reading device 10, when the image reading device 3 stops the reading operation, the CIS 13 performs a predetermined standby operation at a standby position A defined below the inverting path 23A. A white reference board (not illustrated) for obtaining data for correcting non-uniformity of output data from the CIS 13 due to, for example, a precision error is disposed above the standby position A. Therefore, correction data may be obtained quickly at the standby position before the reading operation of the CIS 13.

Figure 5:
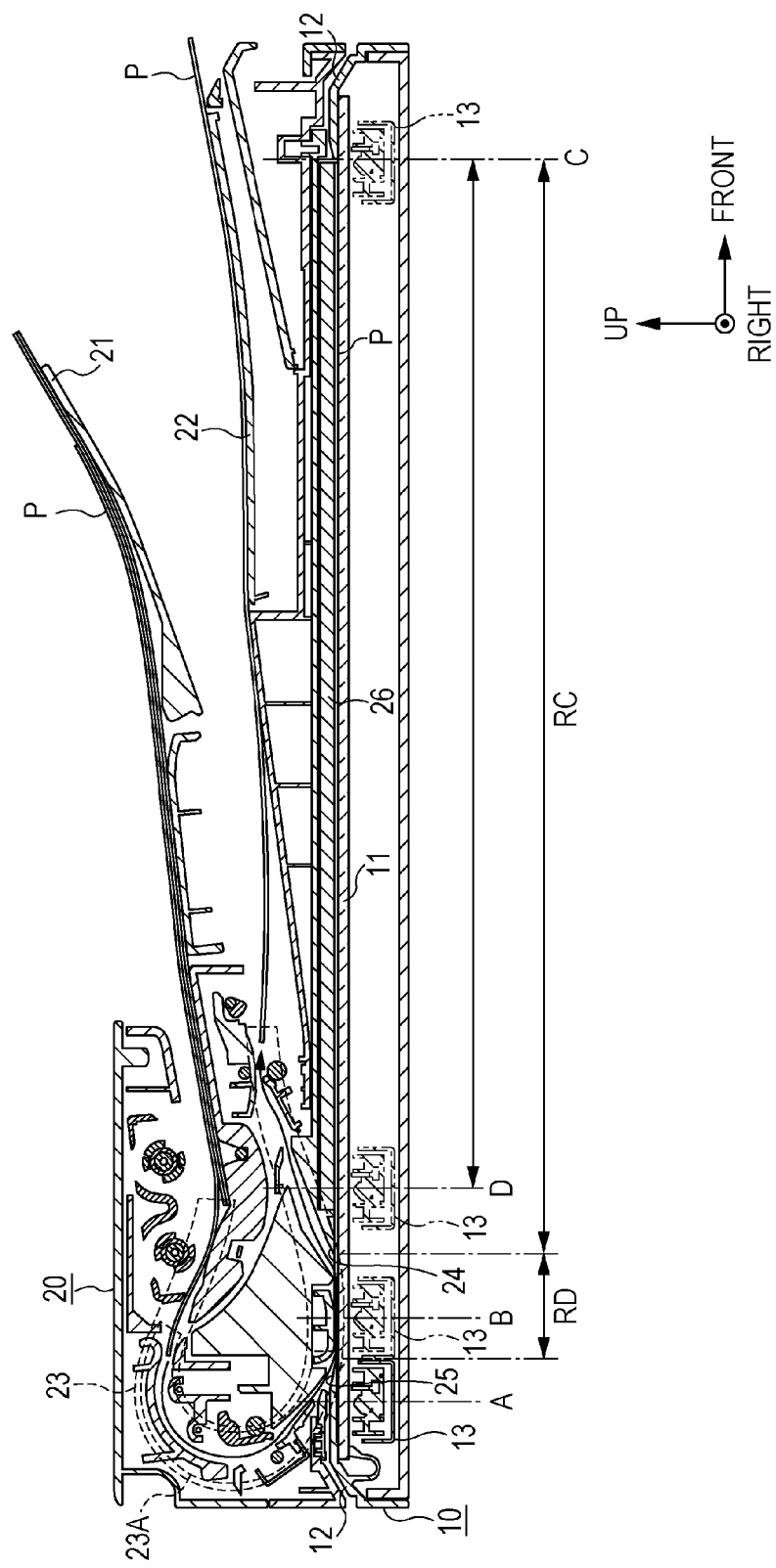
FIG. 5 is a cross-sectional view of an image reading device of the embodiment, illustrating an operation of a contact image sensor module and a cross-sectional structure along a plane including line V-V in FIG. 1.

In a state in which the transport device 20 is situated at the closed position, when the operation to start reading of the original document P is performed by the user after the original document P is placed on the feed tray 21, the CIS 13 is moved from the standby position A to a reading position B in a second reading area RD which corresponds to the transport area RB as illustrated by a dash-dot-dot line in FIG. 5.

After the CIS 13 is moved to the reading position B, the transport device 20 transports, one at a time, the original document P, which is placed on the feed tray 21, through the transport path 23 to the output tray 22. The CIS 13 reads the original document P exposed through the opening 24 in the process transported along the transport path 23 via the cover member 25 and via the transparent plate 11. The transport device 20 outputs all the original documents P placed on the feed tray 21 to the output tray 22. When transport of the original document P by the transport device 20 is completed, the CIS 13 returns from the reading position B to the standby position A.

When the transport device 20 is situated at the open position, the original document P is placed on the transparent plate 11. The original document P is placed at a position in contact with the front and right inner edges of the frame member 12 in the placement area RA of the transparent plate 11. After the original document P is placed on the transparent plate 11, the transport device 20 is moved to the closed position, whereby the original document P is pressed by the mat 26.

After the transport device 20 is moved to the closed position, when the operation to start reading the original document P is performed by the user, the CIS 13 is moved to the reading start position C in a first reading area RC which corresponds to the front inner edge of the frame member 12 and the contact position with the original document P as illustrated by the dash-dot-dot line in FIG. 5. Then the CIS 13 reads the original document P while moving, as illustrated by the dash-dot-dot line in FIG. 5, from the reading start position C to the reading end position D, which is a position defined in the first reading area RC with a predetermined distance to the front direction from the reading position B which corresponds to the opening 24. When the CIS 13 completes the reading of the original document P placed on the transparent plate 11, the CIS 13 returns from the reading end position D to the standby position A as illustrated by a solid line in FIG. 5.

As described above, both in a case in which the CIS 13 reads an image of the original document P transported by the transport device 20 in a state in which the CIS 13 is stopped at the reading position B and in a case in which the CIS 13 reads the image of the original document P placed on the transparent plate 11 in a process in which the CIS 13 is moved from the reading start position C to the reading end position D, data of the image is transmitted to the control device 17 via the FFC 16. Then, the image corresponding to the transmitted data is printed in the image formation device 2.

According to the image reading device 3 and the image formation device 2 of the present embodiment described above, the following effects will be provided.

(1) Since the area below the inverting path 23A in the document reading device 10 which has been a wasted space is used as the standby position A of the CIS 13, it is possible to reduce a wasted space and contribute to reduce the size of the image reading device 3.

(2) Since the placement area RA and the transport area RB are defined to continue from each other on the transparent plate 11, it is possible to contribute to reduce the size of the image reading device 3 by reducing a wasted space produced between these areas.

(3) Since the placement area RA and the transport area RB are formed on a single transparent plate 11, a mechanism for attaching the transparent plate to the document reading device 10 can be simplified as compared with a mechanism in which transparent plates corresponding to these areas are independently attached to the document reading device 10.

(4) Since the front and right inner edges of the frame member 12 is used as a member which defines the placement position of the original document P, the member which defines the placement position of the original document P in the placement area RA and the member which fixes the transparent plate 11 to the document reading device 10 can be shared. Therefore, it is possible to reduce the number of parts and to thereby contribute to reduce the size of the document reading device 10.

The embodiment described above may be modified to other embodiments as described below. In the embodiment described above, it is not necessary that the placement area RA and the transport area RB continue from each other on the transparent plate 11.

In the embodiment described above, the placement area RA and the transport area RB may be formed on different transparent plates. In the embodiment described above, the member which defines the placement position of the original document P may be any member as long as it constitutes two adjoining inner edges, such as the front and left inner edges of the frame member 12. That is, an intersection on the front and left side of the frame member 12 in the placement area RA of the transparent plate 11 may be used as the original position.

In the embodiment described above, the image reading device 3 may be used alone, not used in combination with the image formation device 2. In the embodiment described above, the width of the transport area RB in the left-right direction (i.e., the main scanning direction of the CIS 13) may be the same as the width of the placement area RA in the left-right direction.

In the embodiment described above, the image formation device as the recording device may be a fluid injection device configured to record by injecting or ejecting a fluid other than ink (which includes a liquid, a liquid material in which particles of a functional material are dispersed or mixed in a liquid, a flowable material like gel, and a solid material which may be made to flow and to be injected as a fluid). For example, the image formation device may be a liquid material injection device configured to record by injecting a liquid material which includes, in the form of dispersion or dissolution, an electrode material, a coloring material (i.e., a pixel material) and the like used for, for example, manufacturing a liquid crystal display, an electroluminescence (EL) display and a surface-emitting display. Alternatively, the image formation device may be a flowable material injection device configured to inject a flowable material, such as gel (for example, physical gel) or a particulate material injection device (for example, a tonerjet recording device) configured to inject a solid material like a powder material (particulate material), such as toner. The invention may be applied to any one of these fluid injection devices. In this specification, a "fluid" is a concept which excludes a fluid constituted only by gas and a fluid may include, for example, a liquid (which includes an inorganic solvent, an organic solvent, a solution, liquefied resin, liquefied metal (metal melt) and the like), a liquid material, a flowable material and a particulate material (which includes a granular material and a powder material).

The entire disclosure of Japanese Patent Application No. 2012-142247, filed Jun. 25, 2012 is expressly incorporated by reference herein.

What is claimed is:

1. An image reading device, comprising:
a transparent plate which includes, on a first surface thereof, a placement area in which an original document may be placed;
a reading unit configured to read an image of the original document via the transparent plate from a second surface side of the transparent plate; and
an original document transport device which is moved between a closed position at which the original document transport device is disposed over the transparent plate to cover the first surface side of the transparent plate and an open position at which the first surface side of the transparent plate is uncovered, and, in the closed position, the original document transport device transporting the original document via a partial area which is separated from the placement area on the transparent plate, wherein
the original document transport device includes an inverting path along which the original document is transported in a manner in which front and back sides thereof are inverted at a position opposite to the placement area seen from the partial area of the transparent plate; and
on the second surface side of the transparent plate, the reading unit is moved among a first reading area which corresponds to the placement area of the transparent plate, a second reading area which corresponds to the partial area of the transparent plate, and a standby position defined below the inverting path of the original document transport device, wherein the second reading area is disposed between the standby position and the first reading area,
wherein the image reading device further comprises a white reference that is a detection reference of the original document, wherein when the reading unit moves into the standby position, the reading unit detects the white reference.

2. An image reading device, comprising:
a transparent plate which includes, on a first surface thereof, a placement area in which an original document may be placed;
a reading unit configured to read an image of the original document via the transparent plate from a second surface side of the transparent plate; and
an original document transport device which is moved between a closed position at which the original document transport device is disposed over the transparent plate to cover the first surface side of the transparent plate and an open position at which the first surface side of the transparent plate is uncovered, and, in the closed position, the original document transport device transporting the original document via a partial area which is separated from the placement area on the transparent plate, wherein
the original document transport device includes an inverting path along which the original document is transported in a manner in which front and back sides thereof are inverted at a position opposite to the placement area seen from the partial area of the transparent plate;
a white reference is provided on the second surface side as detection reference of the original document;
the white reference is defined below the inverting path in the original document transport device, and
wherein the white reference is a detection reference of the original document, wherein when the reading unit moves into the standby position, the reading unit detects the white reference.

3. The image reading device according to claim 2, wherein the white reference is defined above a standby position which is defined below the inverting path in the original document transport device.

4. The image reading device according to claim 1, wherein the first reading area and the second reading area continue from each other.

5. The image reading device according to claim 1, wherein the first reading area and the second reading area are formed on the second surface of the single transparent plate.

6. The image reading device according to claim 1, wherein the width of the partial area in the direction perpendicular to the direction in which the original document is transported by the original document transport device is greater than the width of the placement area in the direction perpendicular to the direction in which the original document is transported.

7. The image reading device according to claim 1, further comprising a fixing member which is fixed to edge portions of the transparent plate of the image reading device and includes a corner at which two adjacent sides form a right angle at at least an end of the opposite side of the partial area,
wherein the original document is disposed so as to be in contact with the two sides which are adjacent to each other via the corner of the fixing member.

8. A recording device, comprising: a recording unit configured to record on a medium; and the image reading device according to claim 1.

9. A recording device, comprising: a recording unit configured to record on a medium; and the image reading device according to claim 2.

10. The image reading device according to claim 1, wherein the inverting path is arranged in a side of the image reading device.

11. An image reading device, comprising:
a transparent plate which includes, on a first surface thereof, a placement area in which a first original document may be placed;
a reading unit configured to read an image of the original document via the transparent plate from a second surface side of the transparent plate; and
an original document transport device which is moved between a closed position at which the original document transport device is disposed over the transparent plate to cover the first surface side of the transparent plate and an open position at which the first surface side of the transparent plate is uncovered, and,
in the closed position, the original document transport device transporting a second original document via a partial area which is separated from the placement area on the transparent plate, wherein
the original document transport device includes a feed tray which is disposed above the placement area, and an inverting path along which the second original document is transported from the feed tray to the partial area of the transparent plate in a manner in which front and back sides thereof are inverted in the closed position; and
on the second surface side of the transparent plate, the reading unit is moved among a first reading area which corresponds to the placement area of the transparent plate, a second reading area which corresponds to the partial area of the transparent plate, and a standby position defined below the inverting path of the original document transport device, wherein the second reading area is disposed between the standby position and the first reading area,
wherein the image reading device further comprises a white reference that is a detection reference of the original document, wherein when the reading unit moves into the standby position, the reading unit detects the white reference.

12. An image reading device, comprising:
a transparent plate which includes, on a first surface thereof, a placement area in which an first original document may be placed;
a reading unit configured to read an image of the original document via the transparent plate from a second surface side of the transparent plate; and
an original document transport device which is moved between a closed position at which the original document transport device is disposed over the transparent plate to cover the first surface side of the transparent plate and an open position at which the first surface side of the transparent plate is uncovered, and, in the closed position, the original document transport device transporting a second original document via a partial area which is separated from the placement area on the transparent plate, wherein
the original document transport device includes a feed tray which is disposed above the placement area, and an inverting path along which the second original document is transported from the feed tray to the partial area of the transparent plate in a manner in which front and back sides thereof are inverted in the closed position;
a white reference is provided on the second surface side as detection reference of the original document;
the white reference is defined below the inverting path in the original document transport device, and
wherein the white reference is a detection reference of the original document, wherein when the reading unit moves into the standby position, the reading unit detects the white reference.

* * * * *